(12) United States Patent
Rielau et al.

(10) Patent No.: US 11,397,714 B2
(45) Date of Patent: Jul. 26, 2022

(54) DATABASE IMPLEMENTATION FOR DIFFERENT APPLICATION VERSIONS

(71) Applicant: salesforce.com, inc., San Francisco, CA (US)

(72) Inventors: Serge Philippe Rielau, Alamo, CA (US); Randy Philip Spalten, Benicia, CA (US); Jeffrey Ira Cohen, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 70 days.

(21) Appl. No.: 16/866,331

(22) Filed: May 4, 2020

(65) Prior Publication Data

US 2021/0342322 A1    Nov. 4, 2021

(51) Int. Cl.
*G06F 16/21*    (2019.01)
*G06F 16/2457*    (2019.01)
(Continued)

(52) U.S. Cl.
CPC .......... *G06F 16/219* (2019.01); *G06F 16/211* (2019.01); *G06F 16/221* (2019.01);
(Continued)

(58) Field of Classification Search
CPC ... G06F 8/60; G06F 21/51; G06F 8/61; G06F 16/219; G06F 11/1458
(Continued)

(56) References Cited

U.S. PATENT DOCUMENTS 5,822,748 A    10/1998 Cohen et al.
5,857,182 A    1/1999 DeMichiel et al.
(Continued)

OTHER PUBLICATIONS

International Search Report and Written Opinion in PCT Appl. No PCT/US2021/015025 dated May 18, 2021, 10 pages.
(Continued)

*Primary Examiner* — Hung T Vy
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for handling database queries from multiple different application versions using a single database. A computer system executing a database management system (DBMS) may receive a database query for a database, where the database query is received from a particular version of an application having a plurality of versions. The database query may specify the particular version. The computer system may then identify catalog tables, where the catalog tables include version information columns storing version access information. The computer system may determine that version access information for the database query indicates that one or more database objects corresponding to the database query are accessible to the particular version of the application. Based on the determining, the computer system may access one or more database objects that are responsive to the database query and are accessible to the particular version of the application, which may advantageously reduce or avoid duplication of data stored in the database.

20 Claims, 16 Drawing Sheets

(51) Int. Cl.
*G06F 16/22* (2019.01)
*G06F 16/2458* (2019.01)

(52) U.S. Cl.
CPC ...... *G06F 16/2282* (2019.01); *G06F 16/2474* (2019.01); *G06F 16/24573* (2019.01)

(58) Field of Classification Search
USPC .......................................................... 707/695
See application file for complete search history.

(56) References Cited

U.S. PATENT DOCUMENTS

| | | | |
|---|---|---|---|
| 5,903,888 | A | 5/1999 | Cohen et al. |
| 5,963,934 | A | 10/1999 | Cochrane et al. |
| 5,987,455 | A | 11/1999 | Cochrane et al. |
| 6,421,658 | B1 | 7/2002 | Carey et al. |
| 6,587,854 | B1 | 7/2003 | Guthrie et al. |
| 6,636,846 | B1 | 10/2003 | Leung et al. |
| 6,728,952 | B1 | 4/2004 | Carey et al. |
| 7,162,505 | B2 | 1/2007 | Rielau et al. |
| 7,840,531 | B2 | 11/2010 | Chen et al. |
| 8,005,868 | B2 | 8/2011 | Saborit et al. |
| 8,738,569 | B1 | 5/2014 | Choi et al. |
| 9,058,351 | B2 | 6/2015 | McCline et al. |
| 9,098,536 | B1 | 8/2015 | Choi et al. |
| 9,286,303 | B1 | 3/2016 | Cohen et al. |
| 9,323,791 | B2 | 4/2016 | Hagenbuch et al. |
| 9,514,188 | B2 | 12/2016 | Cohen et al. |
| 9,542,439 | B1 | 1/2017 | Cohen et al. |
| 9,734,186 | B1 | 8/2017 | Cohen et al. |
| 10,261,893 | B2 | 4/2019 | Forbes et al. |
| 10,572,479 | B2 | 2/2020 | Welton et al. |
| 10,810,248 | B2 | 10/2020 | Tang et al. |
| 10,901,857 | B1* | 1/2021 | Chopra ................. G06F 3/065 |
| 2002/0143764 | A1* | 10/2002 | Martin ................. G06F 16/252 |
| 2004/0117358 | A1* | 6/2004 | von Kaenel ........... G06Q 40/08 |
| 2011/0010700 | A1* | 1/2011 | Lanner ................ G06F 9/44505 |
| | | | 717/170 |
| 2014/0143231 | A1 | 5/2014 | Adari et al. |
| 2018/0004792 | A1* | 1/2018 | Desai ................... G06F 16/219 |
| 2020/0004849 | A1 | 1/2020 | Baker et al. |
| 2020/0034357 | A1 | 1/2020 | Panuganty et al. |

OTHER PUBLICATIONS

Managing Editions, Oracle® Database Administrator's Guide; 11g Release 2 (11.2); E25494-01; https://docs.oracle.com/html/E25494_01/general010.htm, 4 pages, [accessed Jan. 7, 2020].

45.7. pg_attribute, The PostgreSQL Global Development Group; https://www.postgresql.org/docs/9.1/catalog-pg-attribute.html, 2 pages [accessed Jan. 8, 2020].

* cited by examiner

DBMS 130

System Catalog 140

Version Catalog Table 210

| Version ID 312 | Version Name 314 | Version Status 316 |
|---|---|---|
| 204.7.2 | Summer 2019 | retired |
| 204.7.3 | Fall 2019 | active |
| 204.7.4 | Spring 2020 | under construction |

Schema Catalog Table 220

| Schema ID 322 | Schema Name 324 | Version ID 312 |
|---|---|---|
| 1 | HR | 204.7.2 |
| 2 | HR | 204.7.3 |
| 3 | HR | 204.7.4 |
| 4 | HR | 0 |

DBMS 130

Database 150

Hr.employee Table 410

| Employee ID 412 | Employee Name 414 | Salary 416 | Bonus 418 |
|---|---|---|---|
| 12345 | Michael Smith | 60,000 | 1200 |
| 12346 | John Doe | 200,000 | 10,000 |
| 12347 | Jane Doe | 120,000 | 6000 |

Hr.emp_name Index 420

| Employee Name 414 | Salary 416 |
|---|---|
| Michael Smith | 60,000 |
| John Doe | 200,000 |
| Jane Doe | 120,000 |

Hr.emp_name_comp Index 430

| Employee Name 414 | Sum 432 |
|---|---|
| Michael Smith | 61,200 |
| John Doe | 210,000 |
| Jane Doe | 126,000 |

Hr.totalcomp Procedure 440

Totalcomp.result = (SELECT salary + bonus FROM hr.employee WHERE totalcomp.employee_name = employee_name)

Fig. 4

Application 120

```
SET application_version = 204.7.3;
ALTER TABLE employee ADD COLUMN bonus TEXT;
                                    Database Command 502
```

To DBMS 130

DBMS 130

System Catalog 140

Column Catalog Table 230

| Table ID 532 | Column Number 534 | Column Name 536 | Start Version 590 | Stop Version 592 |
|---|---|---|---|---|
| 6 | 1 | ID | 204.7.1 | 0 |
| 6 | 2 | Name | 204.7.1 | 0 |
| 6 | 3 | Salary | 204.7.2 | 0 |

Column Addition 512

System Catalog 140

Column Catalog Table 230

| Table ID 532 | Column Number 534 | Column Name 536 | Start Version 590 | Stop Version 592 |
|---|---|---|---|---|
| 6 | 1 | ID | 204.7.1 | 0 |
| 6 | 2 | Name | 204.7.1 | 0 |
| 6 | 3 | Salary | 204.7.2 | 0 |
| 6 | 4 | Bonus | 204.7.3 | 0 |

*Fig. 5A*

Application 120

SET application_version = 204.7.4;
ALTER TABLE employee SET COLUMN bonus RETIRE;
Database Command 504

To DBMS 130

DBMS 130

System Catalog 140

Column Catalog Table 230

| Table ID 532 | Column Number 534 | Column Name 536 | Start Version 590 | Stop Version 592 |
|---|---|---|---|---|
| 6 | 1 | ID | 204.7.1 | 0 |
| 6 | 2 | Name | 204.7.1 | 0 |
| 6 | 3 | Salary | 204.7.2 | 0 |
| 6 | 4 | Bonus | 204.7.3 | 0 |

 Column Retiring 514

System Catalog 140

Column Catalog Table 230

| Table ID 532 | Column Number 534 | Column Name 536 | Start Version 590 | Stop Version 592 |
|---|---|---|---|---|
| 6 | 1 | ID | 204.7.1 | 0 |
| 6 | 2 | Name | 204.7.1 | 0 |
| 6 | 3 | Salary | 204.7.2 | 0 |
| 6 | 4 | Bonus | 204.7.3 | 204.7.4 |

*Fig. 5B*

Application 120
SET application_version = 204.7.1;
CREATE TABLE client;                    Database Command 602
↓ To DBMS 130
DBMS 130
System Catalog 140                              Database Table Catalog Table 240
| Table ID 532 | Schema ID 322 | Table Name 644 | Start Version 590 | Stop Version 592 |
|---|---|---|---|---|
| 6 | 4 | Employee | 204.7.1 | 0 |
 Database Table Creation 612
System Catalog 140                              Database Table Catalog Table 240
| Table ID 532 | Schema ID 322 | Table Name 644 | Start Version 590 | Stop Version 592 |
|---|---|---|---|---|
| 6 | 4 | Employee | 204.7.1 | 0 |
| 7 | 4 | Client | 204.7.1 | 0 |
Fig. 6

*Application 120*

```
SET application_version = 204.7.3;
CREATE INDEX hr.emp_name_comp ON hr.employee (name,
salary, bonus);
                                        Database Command 702
```

To DBMS 130

*DBMS 130*

System Catalog 140  *Index Catalog Table 250*

| Table ID 532 | Index Name 764 | Start Version 590 | Stop Version 592 |
|---|---|---|---|
| 6 | emp_name | 204.7.2 | 0 |

Index Creation 712

System Catalog 140  *Index Catalog Table 250*

| Table ID 532 | Index Name 764 | Start Version 590 | Stop Version 592 |
|---|---|---|---|
| 6 | emp_name | 204.7.2 | 0 |
| 6 | emp_name_comp | 204.7.3 | 0 |

*Fig. 7*

Application 120

```
SET application_version = 204.7.2;
CREATE TRIGGER bonus_trigger AFTER UPDATE ON
employee (bonus);                    Database Command 802
```

To DBMS 130

DBMS 130

System Catalog 140 — Trigger Catalog Table 260

| Table ID 532 | Trigger ID 862 | Trigger Name 864 | Start Version 590 | Stop Version 592 |
|---|---|---|---|---|
| 6 | 12 | salary_trigger | 204.7.1 | 0 |

Trigger Addition 812

System Catalog 140 — Trigger Catalog Table 260

| Table ID 532 | Trigger ID 862 | Trigger Name 864 | Start Version 590 | Stop Version 592 |
|---|---|---|---|---|
| 6 | 12 | salary_trigger | 204.7.1 | 0 |
| 6 | 13 | bonus_trigger | 204.7.3 | 0 |

Fig. 8

Application 120
CREATE PROCEDURE retirement;
Database Command 902
To DBMS 130
DBMS 130
System Catalog 140
Procedure Catalog Table 270
| Procedure ID 972 | Schema ID 322 | Procedure Name 976 |
|---|---|---|
| 4 | 3 | totalcomp |
 Procedure Addition 912
System Catalog 140
Procedure Catalog Table 270
| Procedure ID 972 | Schema ID 322 | Procedure Name 976 |
|---|---|---|
| 4 | 3 | totalcomp |
| 5 | 3 | retirement |
Fig. 9

Application 120

```
SET application_version = 204.7.2;
SELECT load_table_statistics ('employee", 64, 0.3) ;
                                                Database Command 1002
```

To DBMS 130

DBMS 130

System Catalog 140     Statistics Catalog Table 280

| Table ID 532 | Width Statistic 982 | Null Statistic 984 | Start Version 590 | Stop Version 592 |
|---|---|---|---|---|
| 6 | 59 | 0.2 | 204.7.1 | 204.7.2 |

 Statistic Addition 1012

System Catalog 140     Statistics Catalog Table 280

| Table ID 532 | Width Statistic 982 | Null Statistic 984 | Start Version 590 | Stop Version 592 |
|---|---|---|---|---|
| 6 | 59 | 0.2 | 204.7.1 | 204.7.2 |
| 6 | 64 | 0.3 | 204.7.2 | 0 |

Receive a database query for a database, where the database query is received from a particular version of an application having a plurality of versions, and where the database query specifies the particular version.
*1210*

Identify one or more catalog tables, where the one or more catalog tables include one or more version information columns storing version access information.
*1220*

Determine that version access information for the database query indicates that data corresponding to the database query is accessible to the particular version of the application.
*1230*

Access, based on the determining, data that is responsive to the database query and is accessible to the particular version of the application.
*1240*

*Fig. 12*

DATABASE IMPLEMENTATION FOR DIFFERENT APPLICATION VERSIONS

BACKGROUND

Technical Field

This disclosure relates generally to databases, and, more specifically, to implementing a single database for multiple application versions.

Description of the Related Art

As an application is updated, it is often shut down while its corresponding database is updated, e.g., using data definition language (DDL) statements. For example, the schema of the database may be altered for the updated application. This often introduces downtime for the application, which may impede the performance of the application and, in turn, user experience. Additionally, the owner or developer of the application may wish to maintain prior versions of the application alongside the new, updated version of the application. Such a multi-version implementation may introduce errors and/or delays during implementation of the application by a database management system (DBMS) that is handling the database for the multiple versions of the application. For example, database indexes for a new application version may interfere with the implementation of a prior version of the application. Specifically, when an index corresponding to the prior version of the application is dropped in the new version, the DBMS needs to prevent the newly created indexes from interfering with the prior version. If this prevention is unsuccessful, this may introduce delays in processing queries from the prior version of the application.

BRIEF DESCRIPTION OF THE DRAWINGS

FIG. 4 is a block diagram illustrating an example database that includes an employee table for a human resources (HR) application, according to some embodiments.

FIGS. 5A-5D are block diagrams illustrating example alteration of a column catalog table based on adding, retiring, unretiring, and dropping a column for a database table, respectively, according to some embodiments.

FIG. 6 is a block diagram illustrating an example database table catalog table during creation of a database table, according to some embodiments.

FIG. 7 is a block diagram illustrating an example index catalog table during creation of a database index, according to some embodiments.

FIG. 8 is a block diagram illustrating an example trigger catalog table during addition of a database trigger, according to some embodiments.

FIG. 9 is a block diagram illustrating an example procedure catalog table during addition of a database procedure, according to some embodiments.

FIG. 10 is a block diagram illustrating an example statistic catalog table during addition of a database statistic, according to some embodiments.

FIG. 12 is a flow diagram illustrating a method for handling database queries from multiple different application versions, according to some embodiments.

Figure 1:
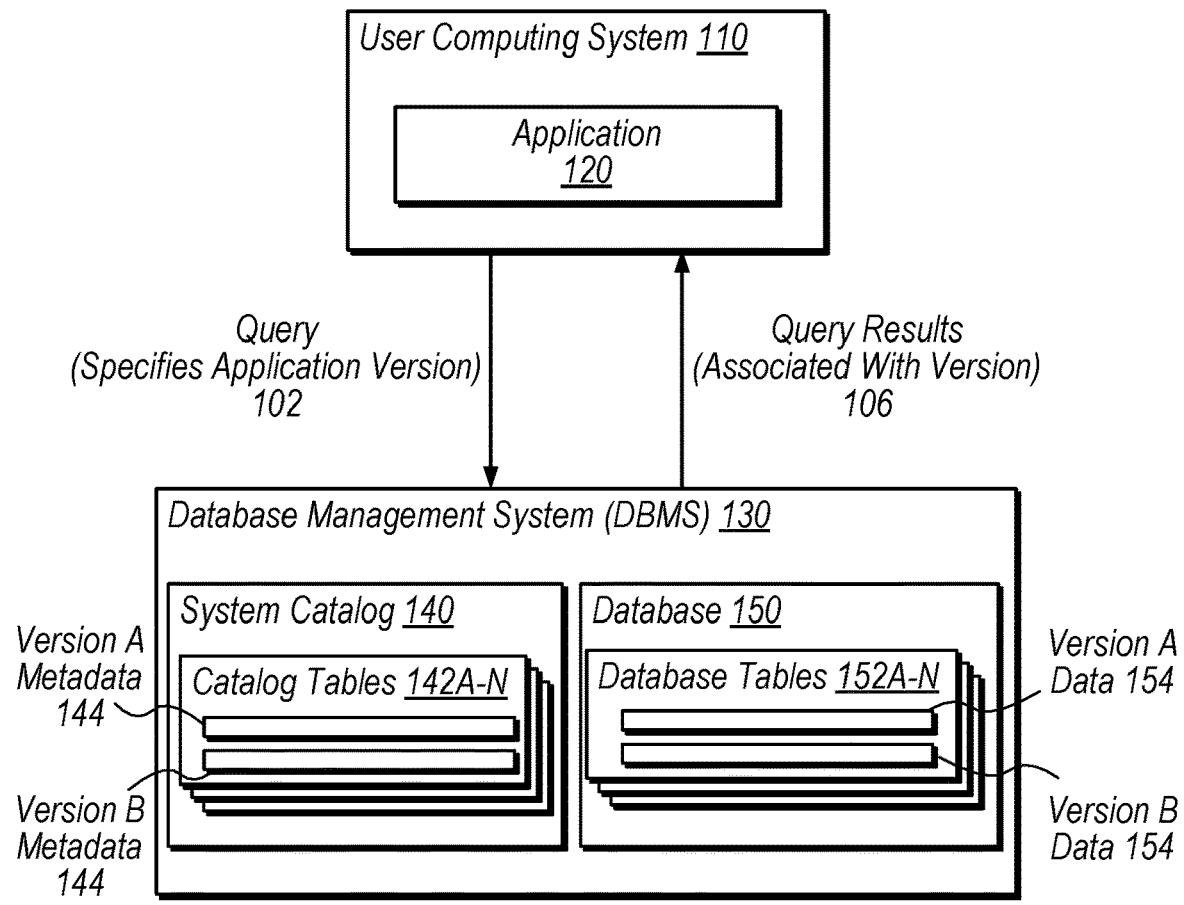
FIG. 1 is a block diagram illustrating an example system configured to process database queries from different application versions, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a database query for database" is intended to cover, for example, a computer system having a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U. S. C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

DETAILED DESCRIPTION

In prior DBMS implementations, one approach for handling multiple application versions included a new version of an application accessing a database management system (DBMS) to retrieve data for processing user requests. In this implementation, the DBMS may load a new database schema for that application into the database with a new schema name. In this example, the new database schema is simply a duplication of the schema of the previous version of the application, but with alterations corresponding to the execution of the new application. Although this implementation works well for database objects that are easily copied (non-persistent objects such as triggers, indexes, statistics, etc.), it introduces problems for persistent database objects such as tables. For example, copying the entire contents of database tables multiple times for multiple different schemas is costly and inefficient.

The present disclosure describes techniques for maintaining data for multiple different application versions in a single database. For example, the disclosed techniques handle queries from multiple application versions at a given time, by implementing application versioning within the system catalog of the database for different objects in the database. The system catalog holds metadata describing database objects stored in the database. For example, an application may be associated with a particular schema in the database and this schema includes a name and a version (such that the schema version corresponds to a given application version). The new versioning techniques involve adding additional columns to database catalog tables to specify an application version associated with various database objects stored in the database. For example, these columns may specify a range of application versions using a start version and a stop version or may specify a particular application version for objects in the database. These database objects may include tables, columns, triggers, indexes, statistics, procedures, views, etc.

In embodiments described herein, a new version of the client application may add a new column "currency" to the "sales" database table. In this example, the database management system adds a new row to a table in the system catalog that includes metadata for database columns. This column catalog table specifies the name of the database table (sales), the name of the added column (currency), and a start version and a stop version of the application associated with this added database column. The database management techniques described in this disclosure may advantageously allow for servicing of multiple different versions of an application at the same time while reducing or avoiding duplication of data stored in the database.

Example DBMS

FIG. 1 is a block diagram illustrating an example system configured to process database queries from different application versions. In the illustrated embodiment, system 100 includes a user computing system 110 and a DBMS 130 configured to communicate for processing application requests.

User computing system 110, in the illustrated embodiment, includes an application 120. User computing system 110 may be an application server configured to facilitate use of application 120 by various different users. For example, in some embodiments, system 110 may be a customer relationship management system that manages applications for various different customers. In some situations, different users (of the same or different customers) use the same application, but implement different versions of this application. For example, system 110 may manage a human resources application for two different users, but each user implements a different version of the human resources application with access to different data maintained by DBMS. In some embodiments, computing systems other than system 110 include different versions of application 120 and are configured to communicate with DBMS 130 for processing queries from these applications. In the illustrated embodiment, user computing system 110 sends query 102 to DBMS 130 for application 120. This query 102 specifies a particular application version.

DBMS 130, in the illustrated embodiment, includes a system catalog 140 and a database 150. As used herein, the term "system catalog" is intended to be construed according to its well-understood meaning, which includes a portion of a database which stores metadata about the data stored in the database such as schemas defining database objects. For example, the system catalog may include various catalog tables and/or catalog views. These catalog tables may include metadata describing data stored in various objects included in the database managed by the DBMS, such as database: tables, columns, triggers, indexes, statistics, procedures, views, etc. These catalog tables may be used to determine the best way to evaluate a structured query language (SQL) query received from an application, for example. The terms "catalog" and "catalog table" may be used interchangeably. In the present disclosure, the catalog tables specify subsets of a dataset stored in the database that are accessible to different applications versions, including which database tables are visible to certain applications.

System catalog 140, in the illustrated embodiment, is collection of tables that contain information about database objects stored in the database 150. For example, system catalog 140 may include a list of schema identifiers that correspond to different versions of an application (or different applications). System catalog 140 includes various catalog tables 142A-N that each include metadata for different versions. For example, in FIG. 1, catalog tables 142A-N includes metadata 144 for versions A and B of application 120. Example catalog tables are discussed below with reference to FIG. 2.

Similarly, in the illustrated embodiment, database 150 includes various database tables 152A-N, which each include data 154 for both version A and version B of application 120. In some embodiments, catalog tables 142A-N and database tables 152A-N include metadata and data for different applications. For example, these tables may include metadata and data for both a human resources application and an accounting application. Additionally, these tables may include metadata and data for different applications as well as different versions of the same application. For example, application version A may be an older version of a particular application and may not see data in columns that were added to the database for application version B, a newer version of the particular application. In this example, version A, however, may still be able to see data in columns that were removed or retired in version B. Said another way, both application versions may see the same rows of data with different sets of columns. DBMS 130 may be any of various database management systems, including: PostgreSQL, MySQL, ORACLE, etc.

The metadata stored in catalog tables 142 may specify locations of database objects stored in database 150 as well as version access information for these objects. That is, the metadata included in catalog tables 142 may indicate, for a particular application version, database objects stored in the database that are accessible to that application version and may be used to respond to queries from the particular application version.

In the illustrated embodiment, DBMS 130 accesses system catalog 140 based on query 102 to determine database objects stored in database 150 that is accessible to the application version specified in the query. Based on this determination, DBMS 130 may use a query optimizer to generate a query plan of execution for database 150. Then, DBMS 130 accesses database 150 based on this plan to retrieve data responsive to query 102. DBMS 130 sends query results 106 to user computing system 110 for application 120. These results are associated with the application version specified in query 102.

As used herein, the term "application version" refers to a particular form of an application that differs from earlier or later forms of the application. For example, an application version may be assigned to a new or updated version of an application using a monotonically increasing numbering scheme which governs the accessibility of various database content to different versions of an application. As one specific example, a first version of an HR application may be assigned version 4.1.3, while a second version of the HR application is assigned version 4.1.4. As used herein the term "metadata" is intended to be construed according to its well-understood meaning, which includes a set of data that describes other data. For example, metadata may be included in catalog tables of the system catalog. Specifically, this metadata may specify an application version associated with a particular schema in the database. Example metadata stored in the system catalog is discussed in detail below with reference to FIGS. 3 and 5A-10.

Example System Catalog

Figure 2:
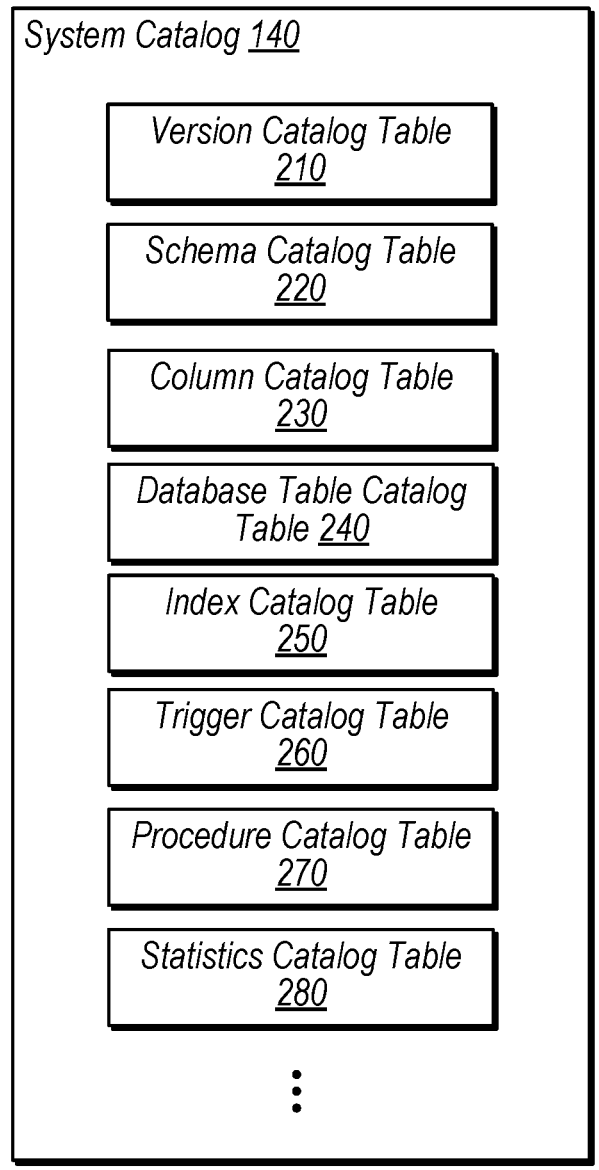
FIG. 2 is a block diagram illustrating an example system catalog of a database management system, according to some embodiments.

FIG. 2 is a block diagram illustrating an example system catalog 140 of DBMS 130. In the illustrated embodiment, system catalog 140 includes the following catalog tables: version catalog table 210, schema catalog table 220, column catalog table 230, database table catalog table 240, index catalog table 250, trigger catalog table 260, procedure catalog table 270, and statistics catalog table 280. Note that any of various other catalog tables for various other types of database objects may be included in system catalog 140 and managed by DBMS 130.

The catalog tables shown in FIG. 2 may include entries (rows) for different objects in the database 150. For example, column catalog table 230 may include entries for various database columns, where these entries include fields with values specifying locations of columns in the database 150 as well as version access information. Further details for different catalog tables are discussed below with reference to FIGS. 3 and 5A-10.

Example Version and Schema Catalog Tables

Figure 3:
FIG. 3 is a block diagram illustrating example version and schema catalog tables, according to some embodiments.

FIG. 3 is a block diagram illustrating example version and schema catalog tables. In the illustrated embodiment, system catalog 140 includes a version catalog table 210 and a schema catalog table 220.

Version catalog table 210 is a table that allows DBMS 130 to look up a particular version ID for a name associated with a particular version of an application and to determine the status of that particular version (whether the application version is active, retired, etc.). Version catalog table 210, in the illustrated embodiment, includes three columns: version identifier (ID) 312, version name 314, and version status 316. Within the table, three different entries (rows) are shown for three different versions of an application. Specifically, the first entry in version catalog table 210 includes schema information for application version 204.7.2, including a version name, Summer 2019, and a version status indicating that this application version is retired. Similarly, application version 204.7.3 is named Fall 2019 and is active, while application version 204.7.4 is named Spring 2020 and is currently under construction. Version catalog table 210 may include any number of entries with applications at various versions and in various states with unique version IDs and application names.

Figure 5C:
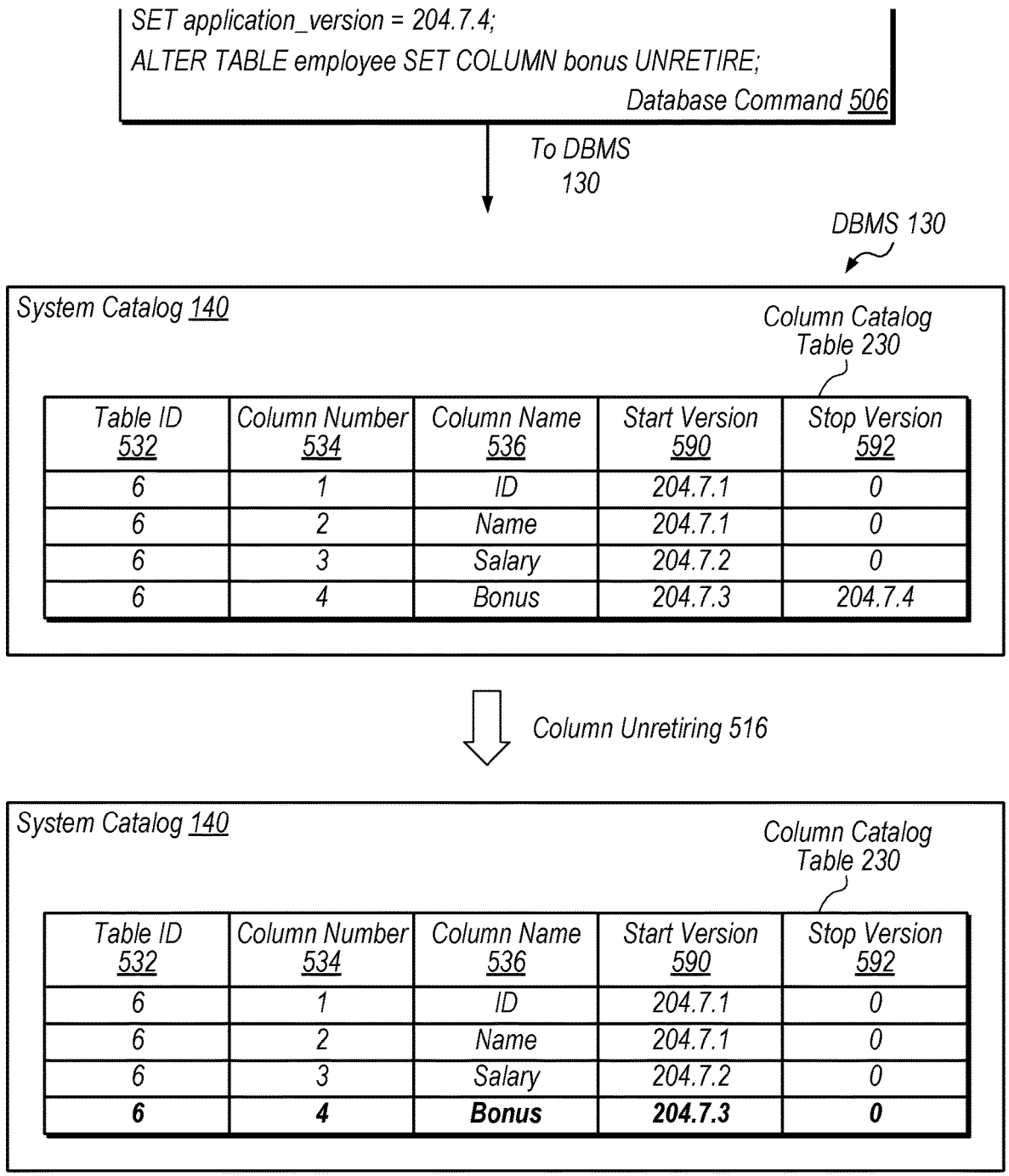
Figure 5D:
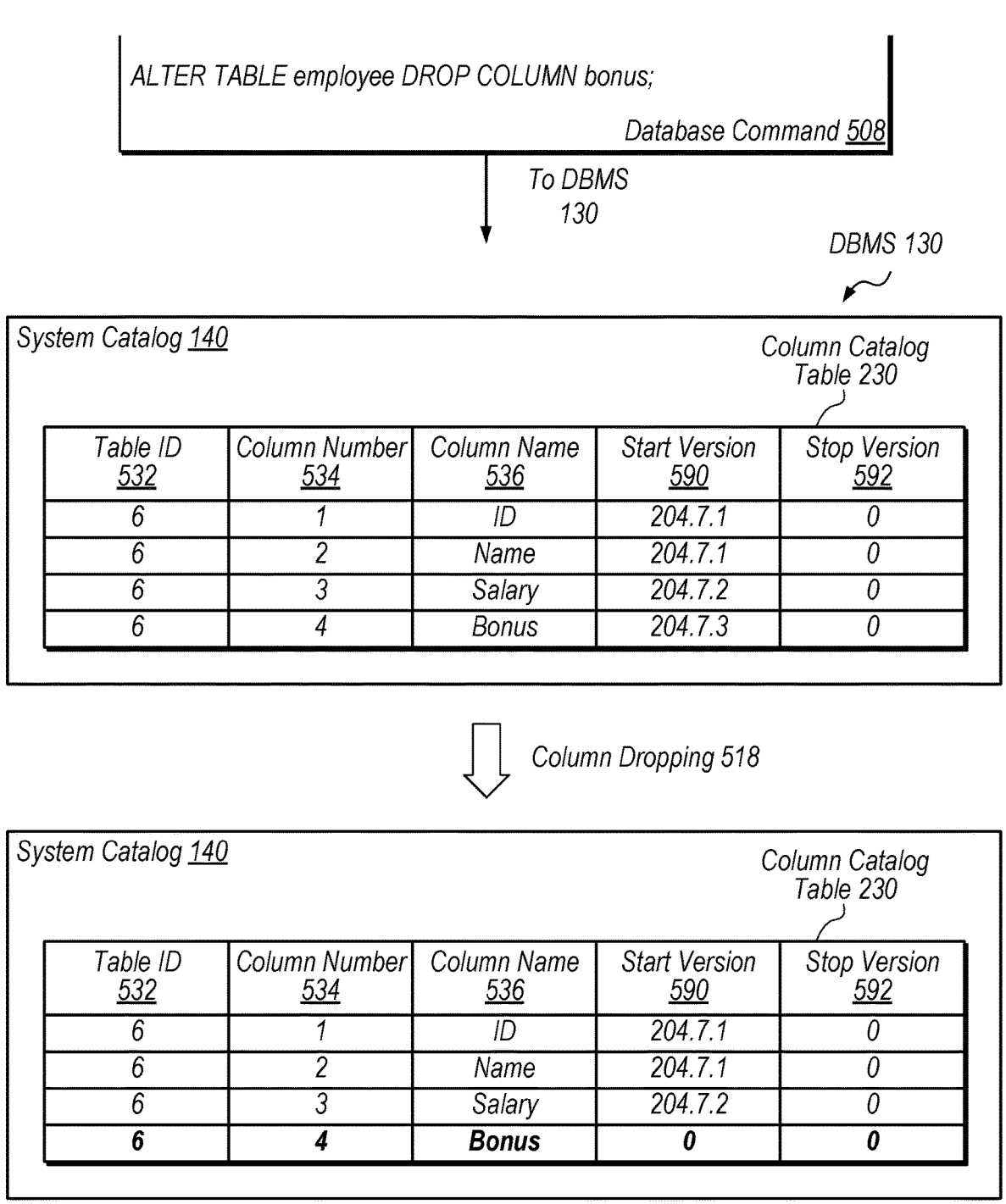

System catalog 140, in the illustrated embodiment, includes a schema catalog table 220 that is usable to look up which particular schema (based on its schema ID) is applicable for a given schema name and a given application version. Specifically, schema catalog table 220 includes three columns specifying: schema ID 322, schema name 324, and version ID 312. The version ID 312 column of schema catalog table 220 is the same as the version ID column of version catalog table 210. A first schema (indicated by schema ID 1) is named HR (as indicated by schema name 324 in FIG. 3) and corresponds to version ID 204.7.2. This pattern continues for other schema IDs, with each new schema ID corresponding to a new version ID. Schema ID 4, however, corresponds to an un-versioned schema. An un-versioned schema is a schema that is visible to existing versions of applications. In some situations, certain database objects (such as views or functions) may be placed in an un-versioned schema because these database objects are expected to be persistent across application versions. Other database objects, such a database tables, may be placed in an un-versioned schema so that the data stored in these objects may be available across various versions of an application, for example. In some cases, a version ID of 0 indicates that a database object has been retired or dropped. FIG. 5D shows an example of dropping a database column and a corresponding version ID of 0 for a start version column. Schema may be defined on a per-application basis (using a particular name), but a given schema may be shared by multiple instances of the same application. Accordingly, the name "HR" may be the name of a schema for a particular application, which may also be called "HR" in some embodiments.

Although FIG. 3 shows entries for the schema named HR, this table may include entries for schemas with different names, such as Accounting, Hiring, Process, etc. A particular application may use multiple different schemas. As one specific example, the application associated with version 204.7.2 and generated in summer of 2019 is a human resources application that may use schemas "HR" and "Hiring."

Example Database

FIG. 4 is a block diagram illustrating an example database 150 that includes an employee table 410 for a human resources (HR) application. In the illustrated embodiment, database 150 includes hr.employee table 410, hr.emp_name index 420, hr.emp_name_comp index 430, and hr.totalcomp procedure 440. The tables shown in FIG. 4 depict, for example, a superset of data that may be stored for multiple versions of the same application (or for different applications) within DBMS 130. As will be discussed in greater detail below with reference to subsequent figures, a given application may be permitted to query only a subset of the information stored in database 150 based on the version information defined in metadata 144 of system catalog 140.

Hr.employee table 410, in the illustrated embodiment, includes four different columns: employee ID 412, employee name 414, salary 416, and bonus 418. Hr.employee table 410 includes three entries, one for each of Michael Smith, John Doe, and Jane Doe. For example, Jane Doe is associated with employee ID 12347, has a salary of $120,000 and a bonus of $6000. In some embodiments, database 150 includes a second table named client. This client table, along with hr.employee table 410, may include data for different versions of an HR application. In some situations, the employee and client tables include data for different applications (e.g., an HR application and an accounting application). As will be discussed below with reference to FIGS. 5A-5D and FIG. 11, certain application versions may not be able to access some of the columns included in hr.employee table 410.

Hr.emp_name index 420 includes the employee name 414 and salary 416 columns of employee table 410, while hr.emp_name_comp index 430 includes the employee name 414 column of hr.employee table 410 as well as a sum 432 column that includes the summed values of the salary and bonus of each employee. For example, the values stored in sum column 432 may be determined by executing hr.totalcomp procedure 440, which is a function that calculates the sum of two different parameters: salary and bonus. The hr.totalcomp procedure 440 receives an employee ID or employee name as input and outputs the total compensation for that employee.

In some embodiments, database 150 includes additional database objects. For example, database 150 may include triggers and statistics as well as any of various other database objects. In particular, database 150 may include a statistic for the salary 416 column of hr.employee table 410 that tracks the average salary of all employees listed in table 410. Information stored in database 150 may be accessible to application versions via queries specifying respective application versions, as discussed below with reference to FIG. 11. For example, these database indexes may not be visible to a particular application version, but are visible to other versions of the particular application.

Example Catalog Tables

FIGS. 5A-5D are block diagrams illustrating example alteration of a column catalog table 230 based on adding, retiring, unretiring, and dropping a column for a database table, respectively. In FIGS. 5A-5D, application 120 sends database commands to DBMS 150 specifying updates based on a new version of the application. These database commands may include data definition language (DDL) operations, for example. In many situations, a new version of application 120 is sending DDL operations to DBMS 130 based on new information being used by this application during operation.

In FIG. 5A, application 120 generates a database command 502 for database 150 and transmits this command to DBMS 130. A database command sent from application 120 to DBMS 130 may be an SQL, Postgres, MySQL, etc. command. Database command 502 includes two different operations. The first operation specifies that a current application version is 204.7.3. For example, application version 204.7.3 is the application version associated with the second operation. The second operation specifies to update hr.employee table 410 by adding a bonus 418 column (e.g., where employee table does not yet include bonus column 418). Based on this database command, DBMS 130 updates metadata stored in system catalog 140 and database objects stored in database 150 (not shown).

DBMS 130, in FIG. 5A, includes a column catalog table 230 that stores metadata for database columns included in database 150. For example, turning back to FIG. 3, database 150 includes hr.employee table 410 with four database columns: employee ID 412, employee name 414, salary 416, and bonus 418. Returning to FIG. 5A, column catalog table 230 includes five different columns: table ID 532, column number 534, column name 536, start version 590 and stop version 592. These five columns specify metadata for the database columns included in database 150. For example, column catalog table 230 includes an entry specifying that the database column named salary 416 is included in table ID 6 (hr.employee table 410), is associated with schema ID 3, and is available to applications starting at version 204.7.2. As one specific example, in the PostgreSQL context, column catalog table 230 is called pg_attribute, where the term "attribute" is equivalent to column and is used for historical reasons.

In the illustrated embodiment, the start version 590 and stop version 592 columns included in column catalog table 230 specifying, for different database columns the application version at which this column is accessible (start version 590) as well as the application version at which these database columns are no longer accessible (stop version 592). For example, the start and stop version columns included in column catalog table 230 specify a range of application versions that are aware of data stored in a particular database column. For example, if application version 204.7.2 attempts to access all columns of hr.employee table 410, the bonus column data will not be listed among the column data returned to the application. In addition, if this application version attempts to directly reference the bonus column in a query, then the query response message will specify "column bonus not found"

Implementation of the start and stop version columns may advantageously prevent older application versions from becoming slow due to these versions relying on indexes that have been dropped in newer application versions. This may also prevent newer application versions from violating service level agreements (SLAs) (e.g., queries from the client application need to be satisfied in under a threshold amount of time). In addition, use of start and stop version columns may allow for storage of information about multiple application versions in a single table as opposed to multiple tables, each dedicated to a particular version. This, in turn, may reduce or remove the need for the DBMS to keep data synchronized between multiple tables. Versioning of column data may reduce or remove the risk of semantically breaking an application due to a single copy of a database table including columns that are visible to all application versions, for example. In this example situations, the query "SELECT*FROM employee table" might return extra columns. The disclosed versioning techniques may also reduce or prevent data stored in a column that is meant to be retired from a database table in a newer version from accidently being accessed by the newer application version in the situation where an application developer was not aware that this data stored in an object that is retired.

DBMS 130 receives database command 502 from application 120 and performs a DDL operation that is executable to add a column (bonus 418 in FIG. 4) to database 150 based on this command. In addition to and concurrently with the DDL operation for database 150, DBMS 130 updates column catalog table 230 by performing a column addition operation 512. For example, column addition 504 operation is executable to add an entry to column catalog table 230. Specifically, DBMS 130 adds a row to column catalog table 230 with values specifying that the new column is named "bonus" and is included in the employee table corresponding to table ID 6 (this new row is shown in bold in the figure). In the depicted example, the bonus database column would be accessible to application version 204.7.3 or newer versions, but would not be accessible to application version 204.7.2 or older versions.

In some embodiments, system catalog 140 includes primary keys and unique constraints for different catalog tables. A primary key may include a set of columns with unique values within a table that are used to identify a row when referenced from another table. For example, column catalog table 230 may include a primary key that is made up of the table ID 532 and column number 534 columns. This primary key is usable to identify a particular row within column catalog table 230. Similarly, a unique constraint may include a set of columns with unique values. For example, column catalog table 230 may include a unique constraint made up of the table ID 532 and column name 536 columns.

In some embodiments, a database command includes multiple updates for a given application version. For example, database command 502 may include multiple different operations (such as the second operation "ALTER TABLE") that indicate differences between database objects that are accessible to prior versions and database objects that are accessible to version 204.7.3.

In FIG. 5B, application 120 sends a database command 504 to DBMS 130 that specifies the application version 204.7.4 and includes an operation for retiring a database column. Based on database command 504, DBMS 130 performs column retiring operation 514 to alter column catalog table 230 by adding a stop version 592 (204.7.4) for the row of table 230 that includes metadata for the bonus database column. In this example, the bonus column included in the employee database table is only accessible to version 204.7.3 of the human resources application.

In some situations, the retirement of the bonus column may be made in error during development (e.g., prior to exposing the retired column via a new application release) of application version 204.7.3. This retiring can be reversed within the same application version. In order to mitigate this error, application 120 may unretire the bonus column. For example, in FIG. 5C, application 120 sends a database command 506 to DBMS 130 specifying application version 204.7.4. Database command 506 includes an operation for unretiring the bonus column in database 150. Based on this command, DBMS 130 performs column unretiring operation 516 to update column catalog table 230 to specify a stop version 592 of "0" for the bonus database column.

In FIG. 5D, application 120 sends a database command 508 to DBMS 130 that includes an operation specifying to drop the bonus column in database 150. Based on database command 508, DBMS 130 performs column dropping operation 518 to update column catalog table 230 such that its start version column 590 specifies a version of "0" for the bonus database column. In some situations, an application 120 will only be allowed to drop a column (or any other database object) when that column is no longer available to other application versions. That is, stop version 592 column for the bonus column must specify an application version that is older than or the same as the oldest version of an application. For example, a column may be dropped when it has been retired in an application version that is older than the last supported version of the application.

FIG. 6 is a block diagram illustrating an example database table catalog table during creation of a database table. In the illustrated embodiment, database catalog table 240 includes the following columns including metadata specifying data stored in tables in database 150: table ID 542, schema ID 322, table name 644, start version 590, and stop version 592. Database catalog table 240 includes metadata specifying whether information stored in database tables in database 150 are visible to different application versions. For example, the first row of database table catalog table 240 includes table ID of 6, a schema ID of 4, is named "Employee," and is accessible to applications beginning at application version 204.7.1. Schema ID 4 refers to an un-versioned schema and, therefore, the employee table (table ID 6) may be visible to multiple different application versions. In some situations, it may be desirable to have database tables be visible across application versions and, as such, these database tables may live in an un-versioned schema.

In the illustrated embodiment, application 120 sends database command 602 to DBMS 130. This database command includes an operation for creating a table in database 150 called "client." After generating a client table in database 150, DBMS 130 performs database table creation operation 612 to add an entry to database table catalog table 240 in system catalog 140. In the illustrated embodiment, the second row of database table catalog table 240 specifies application version 204.7.1 as the start version 590 for the client database table. In this example, both the employee and client database tables are accessible to applications associated with versions 204.7.1 and later.

FIG. 7 is a block diagram illustrating an example index catalog table during creation of a database index. In the illustrated embodiment, index catalog table 250 includes the following columns including metadata specifying data stored in indexes in database 150: table ID 542, index name 764, start version 590, and stop version 592. Index name 764 column, for example, stores values specifying the names of various different database indexes.

DBMS 130, in the illustrated embodiment, receives a database command 702 from application 120 specifying to create a new index in database 150. Based on this command, DBMS 130 generates a new index hr.emp_name_comp 430. After generating the new index, DBMS 130 performs index creation operation 712 to add an entry to index catalog table 250 for index 430 indicating that this index is accessible to application version 204.7.3 (and newer versions) and, therefore, this index is not usable by application version 204.7.2 and older versions. DBMS 130, however, will maintain indexes that are present within the database, even in situations where these indexes are not usable (cannot be exploited) by certain application versions (such as versions 204.7.2 and earlier).

FIG. 8 is a block diagram illustrating an example trigger catalog table during addition of a database trigger. In the illustrated embodiment, trigger catalog table 260 includes the following columns with metadata specifying triggers stored in database 150: table ID 532, trigger ID 862, trigger name 864, start version 590, and stop version 592. Trigger ID 862 and trigger name 864, for example, store values specifying identifiers and names, respectively, for various database triggers.

DBMS 130, in the illustrated embodiment, receives a database command 802 from application 120 specifying to add a trigger to database 150. Based on this command, DBMS 130 generates a new trigger on the bonus column of the employee table in database 150. After adding the trigger to database 150, DBMS performs trigger addition operation 812 to add an entry to trigger catalog table 260 for the new "bonus trigger" for application version 204.7.3. In this example, the "bonus trigger" will only execute for applications associated with version 204.7.3 or later.

FIG. 9 is a block diagram illustrating an example procedure catalog table during addition of a database procedure. In the illustrated embodiment, procedure catalog table 270 includes the following columns with metadata specifying procedures stored in database 150: procedure ID 972, schema ID 974, and procedure name 976. Procedure ID 972 and procedure name 976 columns, for example, store values specifying identifiers and names, respectively, of various database procedures.

DBMS 130, in the illustrated embodiment, receives a database command 902 from application 120 specifying to add a procedure to database 150. Based on this command, DBMS 130 generates a new procedure called "retirement" for a particular schema (corresponding to application version 204.7.4 according to schema catalog table 220 in FIG. 3) in database 150. After adding the new procedure to database 150, DBMS 130 performs procedure addition operation 912 to add an entry to procedure catalog table 270 for the new "retirement" procedure for schema ID 3. In this example, the procedure "retirement" will only be visible to queries for applications associated with version 204.7.4.

FIG. 10 is a block diagram illustrating an example statistic catalog table during addition of a database statistic. In the illustrated embodiment, statistics catalog table 280 includes the following columns with metadata specifying statistics for different database table stored in database 150: table ID 532, width statistic 982, null statistic 984, start version 590, and stop version 592. Width statistic 982 and null statistic 984 are non-limiting examples of the types of statistics that may be generated for a given database table. Width statistic 982 may specify, for example, the average stored width, in bytes, of nonnull entries in a given database table.

Database command 1002, in the illustrated embodiment, includes an operation for loading statistics for hr.employee database table 410 into database 150. After executing this operation, DBMS 130 performs statistic addition operation 1012 to add an entry to statistics catalog table 280 that specifies width and null statistics for human resources application version 204.7.2. In this example, a query optimizer of the DBMS 130 will only be able to use the null statistic for queries from an application associated with version 204.7.2 or later.

Figure 11:
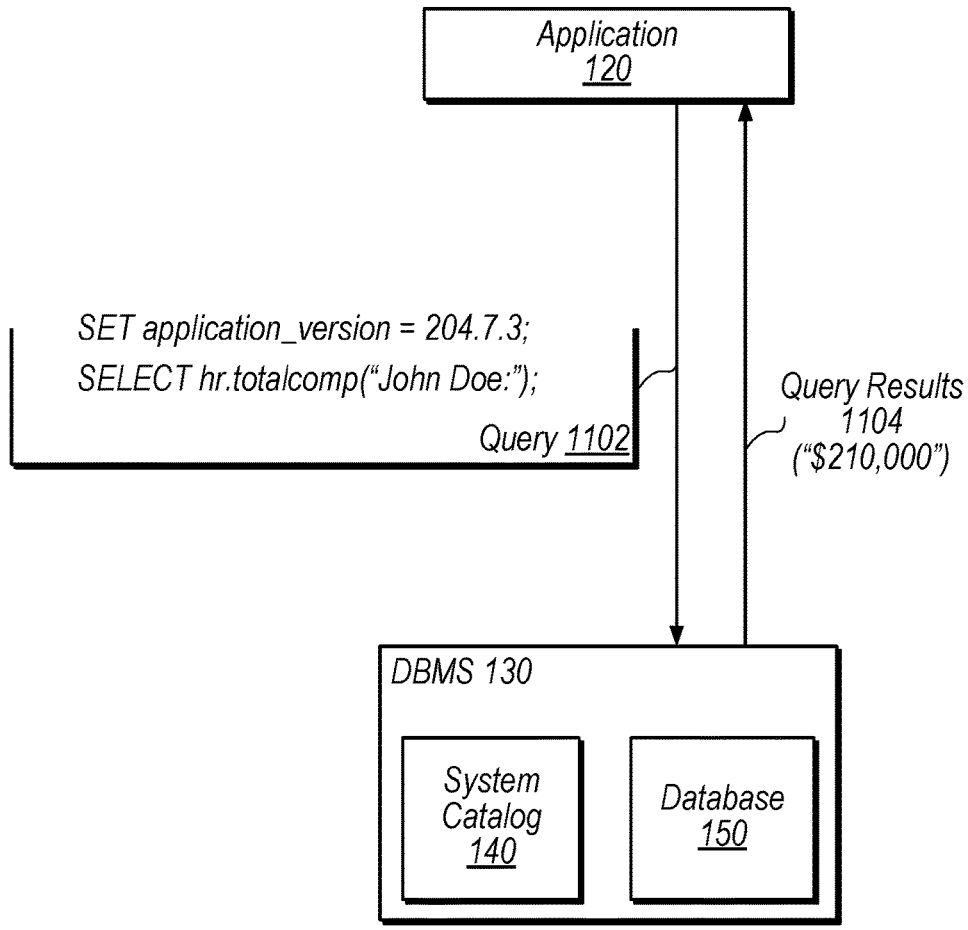
FIG. 11 is a block diagram illustrating an example database query, according to some embodiments.

FIG. 11 is a block diagram illustrating an example database query 1102. In the illustrated embodiment, system 1100 includes application 120 and DBMS 130. Application 120 sends query 1102 to DBMS 130. Query 1102 specifies that application 120 is currently operating under version 204.7.2 and, therefore, this query is requesting to access database objects that are accessible to this version. In addition, query 1102 specifies to select the data generated by the hr.totalcomp procedure 440 for the employee named "John Doe."

The following example description includes references to database objects shown in FIG. 4. Application 120, shown in FIG. 11, may be a human resources application requesting compensation information for a particular employee (John Doe). In order to respond to query 1102, DBMS 130 accesses system catalog 140 to determine whether the procedure "totalcomp" belongs to schema ID 1. Based on determining that it does indeed belong to schema 1, DBMS 130 verifies: 1) schema ID 1 is a schema named "HR" and 2) schema ID 1 is a schema that matches application version 204.7.2. Based on this information, DBMS 130 accesses database 150 to obtain the results of calculating the total compensation (salary+bonus) for John Doe.

Note that query 1102 may be satisfied either by accessing hr. employee table 410 to obtain salary and bonus information for John Doe, accessing the Hr.totalcomp procedure 440 and then plugging these values into the procedure 440, or by accessing the hr.emp_name_comp index 430 (if this index is accessible to application version 204.7.3—which in this case it is) and obtaining the sum 432 of salary 416 and bonus 418 columns for John Doe. If DBMS 130 were to use hr.emp_name_comp index to respond to query 1102, this system would first access index catalog table 250 to determine that the hr.emp_name_comp index is accessible starting at application version 204.7.3. In this example scenario, DBMS 130 then checks that the salary, bonus, and name columns of the hr.employee table 410 are visible to applications at version 204.7.3. Then, DBMS determines that the emp_name and emp_name_comp indexes are visible to applications at version 204.7.3. Based on this information, DBMS 130 would then access database index 430 to obtain the data requested by application 120. Had the emp_name_comp index been added in application version 204.7.4 instead of 204.7.3, then DBMS 130 would have had to forgo using this index. In the illustrated embodiment, after accessing database 150 to obtain the total compensation for John Doe, DBMS 130 sends query results 1104 to application 120 specifying that the total compensation for John Doe is $210,000.

Example Method

Turning now to FIG. 12, a flow diagram illustrating an example method 1200 for handling database queries from multiple different application versions, according to some embodiments. The method shown in FIG. 12 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1210, in the illustrated embodiment, a computer system executing a database management system (DBMS) receives a database query for a database, where the database query is received from a particular version of an application having a plurality of versions, and wherein the database query specifies the particular version. In some embodiments, prior to receiving the database query for the database, the computer system receives, from a particular version of the application, updates for the application, where the updates are associated with the particular version. In some embodiments, the computer system alters, based on the received updates, the one or more catalog tables, where the altering includes altering metadata stored in the catalog tables that specifies one or more database objects stored in the database that are accessible to the particular version. In some embodiments, the updates indicate one or more differences between database objects that are accessible to the particular version and database objects that are accessible to an earlier version of the application.

In some embodiments, the DBMS may receive database queries that do not specify a particular application version. For example, in some situations a current application version may be known to the DBMS and this known application version is used for receives queries, unless and until the DBMS receives a SET command (such as the SET commands shown in FIGS. 5A-8 and 10-11) specifying a different application version.

At 1220, the computer system identifies one or more catalog tables, where the one or more catalog tables include one or more version information columns storing version access information. In some embodiments, the one or more version information columns include a start version column and a stop version column that specify a range of application versions for which one or more database objects stored in the database are accessible. For example, the start version column may indicate an application version at which database objects begin to be available and the stop version column may indicate an application version at which database objects are no longer accessible. Said another way, the stop version column may specify an application version (and any later application version) that cannot access the database objects. In some embodiments, the version information columns specify version access information for the one or more database objects. In some embodiments, the one or more database objects include one or more of the following types of objects: schema, table, column, index, trigger, procedure and statistics. The one or more database objects may include any of various combinations of the object types included in this list or any of various other types of database object not explicitly recited in the above list. For example, database objects stored in a database may include a schema object and a database object, a schema object or a table object but not both, all seven types of database objects, or any combination thereof. In some embodiments, one of the catalog tables is a schema catalog table that specifies, for at least one application, a schema that is applicable to that one application. In some embodiments, the schema catalog table specifies schema names that correspond to different applications.

In some embodiments, a database object is accessible to a single application version. In other embodiments, a database object may have a lifetime that spans multiple versions of an application. The lifetime of a database object may be specified by start and stop version columns. In other situations, however, the lifetime of a database objects may be specified by a single column that uses an interval datatype. In this situation, the single column specifies a range of application versions that have access to the database object.

In some embodiments, the version information columns specify version access information for at least a schema object and a database table object of the database, where the schema object is a named collection of tables and the database table object is a particular type of table that stores data in the database for the application having the plurality of versions. In some embodiments, the identified catalog tables include a first catalog table that defines version access information in a first format and a second catalog table that defines version access information in a second format. In some embodiments, the first format specifies version access information as a particular application version and the second format specifies version access information as a range of application versions.

At 1230, the computer system determines that version access information for the database query indicates that one or more database objects corresponding to the database query are accessible to the particular version of the application.

At 1240, the computer system accesses, based on the determining, one or more database objects that are responsive to the database query and are accessible to the particular version of the application. In some embodiments, the version access information for the database query permits, for the particular version of the application, access to a first portion of data included in the one or more database objects. For example, information stored in the salary column 416 included in hr.employee table 410 (one example of a database object) may be accessible to the particular version of the application. In some embodiments, in response to receiving an additional database query from a different version of the application, the computing system accesses, based on version access information for the different version of the application, a second portion of the data included in the one or more database objects. For example, information stored in both the salary column 416 and bonus column 418 included in hr.employee table may be accessible to the different version of the application. In some embodiments, based on receiving database queries from two different versions of an application and their respective version access information, the computer system accesses different database objects. For example, the computing system may determine that hr.employee table 410 (one example database object) is accessible to a first application version, while a client table (another example database object) is accessible to a second application version.

In some embodiments, the computer system adds an index table to the database. In some embodiments, based on adding the index table, the computer system adds a row to an index catalog table that includes metadata for one or more index tables in the database, where the row includes respective values for a start version column and a stop version column specifying information indicative of one or more versions of the application for which one or more database objects stored in the database are accessible.

In some embodiments, a particular version of an application transmits a database query for a database to a DBMS, where the database query specifies the particular version of the application. In some embodiments, the database maintains version access information in one or more version information columns of one or more catalog tables. In some embodiments, the particular version of the application receives, from the DBMS, data that is responsive to the database query. In some embodiments, the data is retrieved from the database based on the version access information specifying that the data is accessible to the particular version of the application. In some embodiments, the particular version of the application transmits, to the DBMS, updates for one or more database objects, where the updates are associated with the particular version. In some embodiments, the updates include alterations for metadata stored in one or more catalog tables.

Example Computing Device

Figure 13:
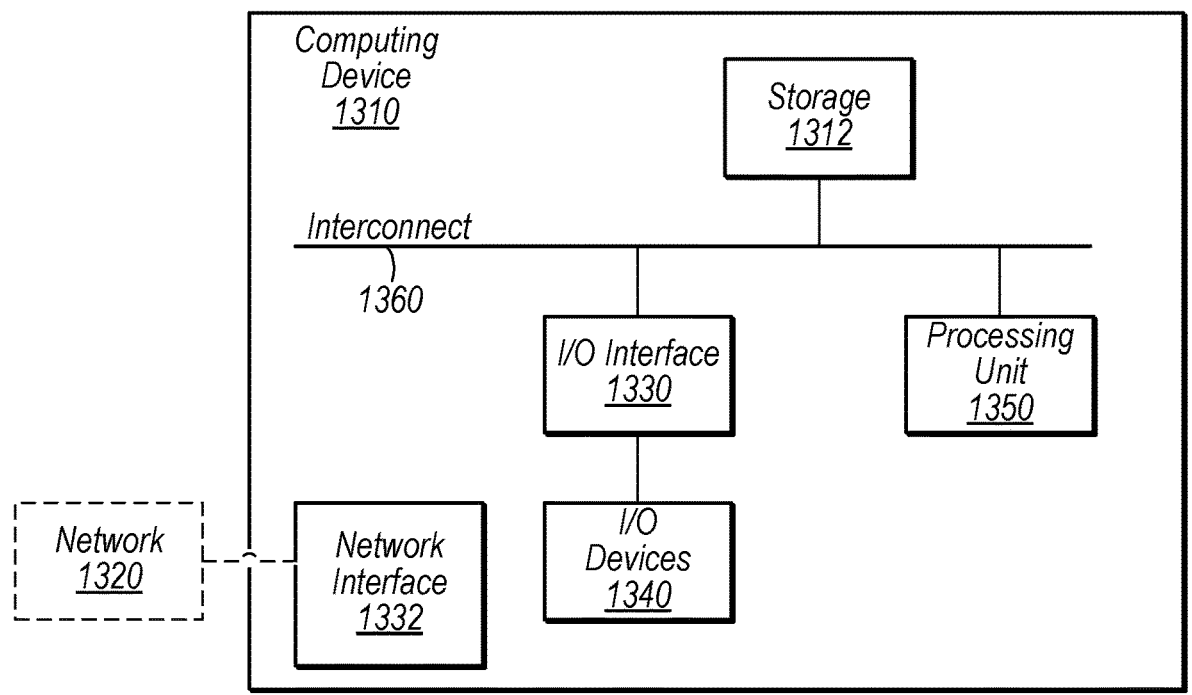
FIG. 13 is a block diagram illustrating an example computing device, according to some embodiments.

Turning now to FIG. 13, a block diagram of a computing device (which may also be referred to as a computing system) 1310 is depicted, according to some embodiments. Computing device 1310 may be used to implement various portions of this disclosure. Computing device 1310 is one example of a device that may be used as a mobile device, a server computer system, a client computer system, or any other computing system implementing portions of this disclosure. For example, computing device 1310 may implement computing system 110 and/or DBMS 130. In some situations, computing device 1310 executes application 130.

Computing device 1310 may be any suitable type of device, including, but not limited to, a personal computer system, desktop computer, laptop or notebook computer, mobile phone, mainframe computer system, web server, workstation, or network computer. As shown, computing device 1310 includes processing unit 1350, storage subsystem 1312, and input/output (I/O) interface 1330 coupled via interconnect 1360 (e.g., a system bus). I/O interface 1330 may be coupled to one or more I/O devices 1340. Computing device 1310 further includes network interface 1332, which may be coupled to network 1320 for communications with, for example, other computing devices.

Processing unit 1350 includes one or more processors and, in some embodiments, includes one or more coprocessor units. In some embodiments, multiple instances of processing unit 1350 may be coupled to interconnect 1360. Processing unit 1350 (or each processor within processing unit 1350) may contain a cache or other form of on-board memory. In some embodiments, processing unit 1350 may be implemented as a general-purpose processing unit, and in other embodiments it may be implemented as a special purpose processing unit (e.g., an ASIC). In general, computing device 1310 is not limited to any particular type of processing unit or processor subsystem.

As used herein, the term "processing unit" refers to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

Storage subsystem 1312 is usable by processing unit 1350 (e.g., to store instructions executable by and data used by processing unit 1350). Storage subsystem 1312 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1312 may consist solely of volatile memory in some embodiments. Storage subsystem 1312 may store program instructions executable by computing device 1310 using processing unit 1350, including program instructions executable to cause computing device 1310 to implement the various techniques disclosed herein.

I/O interface 1330 may represent one or more interfaces and may be any of various types of interfaces configured to couple to and communicate with other devices, according to various embodiments. In some embodiments, I/O interface 1330 is a bridge chip from a front-side to one or more back-side buses. I/O interface 1330 may be coupled to one or more I/O devices 1340 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 13 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system executing a database management system (DBMS), a database query for a database, wherein the database query is received from a particular version of an application having a plurality of versions, and wherein the database query specifies the particular version;
   identifying, by the computer system, one or more catalog tables, wherein the one or more catalog tables include a first column comprising a start version column and a second, different column comprising a stop version column, wherein the start version column and the stop version column for a given database object specify a range of application versions for which the given database object is accessible;
   determining, by the computer system based on version access information stored in the one or more catalog tables, that one or more database objects corresponding to the database query are accessible to the particular version of the application; and
   accessing, by the computer system based on the determining, one or more database objects that are responsive to the database query and are accessible to the particular version of the application.

2. The method of claim 1, wherein the start version column and stop version column included in a catalog table for a column database object included in a database table object stored in the database specify a range of two or more application versions for which the column database object is accessible.

3. The method of claim 1, wherein the start version column and the stop version column specify version access information for one or more of the following types of objects: schema, table, column, index, trigger, procedure and statistics.

4. The method of claim 1, further comprising:
prior to the receiving the database query for the database:
receiving, by the computer system from the particular version of the application, updates for the application, wherein the updates are associated with the particular version; and
altering, by the computer system based on the received updates, the one or more catalog tables, wherein the altering includes altering metadata stored in the catalog tables that specifies one or more database objects stored in the database that are accessible to the particular version.

5. The method of claim 4, wherein the updates indicate one or more differences between database objects that are accessible to the particular version and database objects that are accessible to an earlier version of the application.

6. The method of claim 1, wherein one of the catalog tables is a schema catalog table that specifies, for at least one application, a schema that is applicable to that one application.

7. The method of claim 1, wherein the version access information for the database query permits, for the particular version of the application, access to a first portion of data included in the one or more database objects, and wherein the method further comprises:
in response to receiving an additional database query from a different version of the application, accessing, by the computing system based on version access information for the different version of the application, a second, different portion of the data included in the one or more database objects.

8. The method of claim 1, wherein the identified catalog tables include a first catalog table that defines version access information in a first format and a second catalog table that defines version access information in a second, different format.

9. The method of claim 8, wherein the first format specifies version access information as a particular application version, and wherein the second, different format specifies version access information as a range of application versions.

10. A non-transitory computer-readable medium having instructions stored thereon that are capable of causing a computing device executing a database management system (DBMS) to implement operations comprising:
receiving a database query for a database, wherein the database query is received from a particular version of an application having a plurality of versions, and wherein the database query specifies the particular version;
identifying one or more catalog tables, wherein the one or more catalog tables include one or more version information columns storing version access information, wherein the one or more version information columns include a first column comprising a start version column and a second, different column comprising a stop version column, wherein the start version column and the stop version column for a given database object specify a range of application versions for which the given database object is accessible;
determining, based on version access information stored in the one or more catalog tables, that one or more database objects corresponding to the database query are accessible to the particular version of the application; and
accessing, based on the determining, data that is responsive to the database query and are accessible to the particular version of the application.

11. The non-transitory computer-readable medium of claim 10, the start version column and stop version column included in a catalog table for a column database object included in a database table object stored in the database specify a range of two or more application versions for which the column database object is accessible.

12. The non-transitory computer-readable medium of claim 10, wherein the start version column and the stop version column specify version access information for at least a schema object and a database table object of the database, wherein the schema object is a named collection of tables and the database table object is a particular type of table that stores data in the database for the application having the plurality of versions.

13. The non-transitory computer-readable medium of claim 10, wherein the operations further comprise:
prior to the receiving the database query for the database:
receiving, from the particular version of the application, updates for the application, wherein the updates are associated with the particular version; and
altering, based on the received updates, the one or more catalog tables, wherein the altering includes altering metadata stored in the catalog tables that specifies one or more database objects stored in the database that are accessible to the particular version.

14. The non-transitory computer-readable medium of claim 10, wherein one of the catalog tables is a schema catalog table that specifies, for at least one application, a schema that is applicable to that one application, and wherein the schema catalog table specifies schema names that correspond to different applications.

15. The non-transitory computer-readable medium of claim 10, wherein the operations further comprise:
adding an index table to the database; and
based on adding the index table, adding a row to an index catalog table that includes metadata for one or more index tables in the database, wherein the row includes respective values for a start version column and a stop version column specifying information indicative of one or more versions of the application for which one or more database objects stored in the database are accessible.

16. The non-transitory computer-readable medium of claim 10, wherein the version access information for the database query permits, for the particular version of the application, access to a first portion of data included in the one or more database objects, and wherein the operations further comprise:
in response to receiving an additional database query from a different version of the application, accessing, based on version access information for the different version of the application, a second, different portion of the data included in the one or more database objects.

17. A method, comprising:
transmitting, by a particular version of an application having a plurality of versions to a database management system (DBMS), a database query for a database, wherein the database query specifies the particular version of the application, and wherein the database maintains one or more catalog tables include a first column comprising a start version column and a second, different column comprising a stop version column, wherein the start version column and the stop version column for a given database object specify a range of application versions for which the given database object is accessible; and receiving, by the particular version of the application from the DBMS, data that is responsive to the database query, wherein the data is retrieved from the database based on version access information stored in the one or more catalog tables specifying that one or more database objects are accessible to the particular version of the application.

18. The method of claim 17, further comprising:
transmitting, by the particular version of the application to the DBMS, updates for one or more database objects, wherein the updates are associated with the particular version, and wherein the updates include alterations for metadata stored in one or more catalog tables.

19. The method of claim 17, wherein one of the catalog tables is a schema catalog table that specifies, for at least one application, a schema that is applicable to that one application.

20. The method of claim 17, wherein the start version column and the stop version column specify version access information for at least a schema object and a database table object of the database, wherein the schema object is a named collection of tables and the database table object is a particular type of table that stores data in the database for the application having the plurality of versions.

* * * * *